United States Patent Office 3,207,218 Patented Sept. 21, 1965

1

3,207,218
USE OF FOAM FOR PLUGGING GAS PRODUCING STRATA

Orrin C. Holbrook and George G. Bernard, Crystal Lake, Ill., assignors to The Pure Oil Company, Chicago, Ill., a corporation of Ohio No Drawing. Filed Dec. 19, 1961, Ser. No. 160,660
5 Claims. (Cl. 166—32)

This invention relates to the treating of subterranean formations penetrated by wells. More particularly, it relates to the treatment of formations which produce both a gas and a liquid, to reduce the rate of production of the gas, without substantially diminishing the rate of production of the liquid.

A frequent occurrence in oil fields having gas caps is the formation of gas channels from the cap through one or more strata to the producing well. The resulting high gas-to-oil ratio of the produced fluids represents a loss of formation energy, and a decrease in the oil which can ultimately be produced from the formation. In extreme cases, excessive gas production necessitates that the oil-production rate from the well be decreased, and possibly that the well be closed.

The prior art recognizes several methods for treating the formation surrounding a well-bore to decrease the rate of flow of gas to the well. Generally, these methods comprise the packing-off of a portion of the well which receives undesirably large quantities of gas, and the treating of the packed-off portion of the formation to plug the formation and render it impermeable. Now, in accordance with this invention, a method has been devised for selectively reducing the flow of gas without reducing the flow of oil from producing wells in cases where a gas cap has encroached into the oil producing portions of the well, or where injected gas has broken through to the producing well. This selective treatment is accomplished without the necessity of employing packers, for the whole extent of the well-bore may be subjected to the treating process, but the process itself is selective only to close the gas-producing zones.

The method of this invention is applied when gas breaks through into a producing well. It consists simply of interrupting production, injecting a quantity of oil containing an oil-soluble foaming agent into the producing strata through the producing well, and then resuming production. When production is resumed, the solution of oil and foaming agent is produced from the oil-containing strata without any effect, but contact of the gas with the solution in the gas-containing strata creates foam which retards the flow of gas to the producing wells. Thus, in effect, the process is selective for the plugging of the gas channels without resorting to the use of packers to isolate the channels to be treated.

While the process will find widest use in the treatment of oil-producing wells, it is apparent that substantially the some technique, using an aqueous solution of a water-soluble foaming agent in place of the oil solution of oil-soluble foaming agent, can be applied to water-producing wells. This embodiment is expected to find greatest utility in the operation of underground gas-storage facilities, where the size of the gas-containing zone is varied by injecting or withdrawing water from the water table underlying the gas. In such installation, difficulties frequently are caused by coning of gas into the wells from which water is being withdrawn.

2

The following block diagram will graphically illustrate the embodiments of this invention:

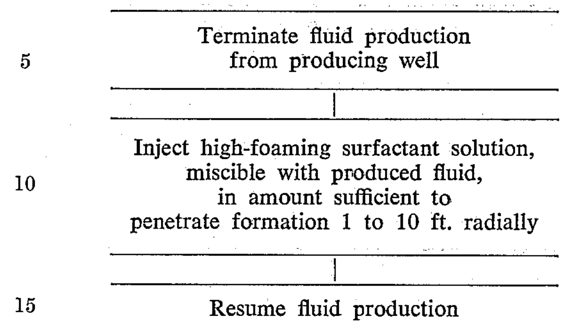

The amount of the water-base or oil-base solution of foaming agent injected through the producing well and into the surrounding formation, in accordance with the method of this invention, is preferably sufficient to create a treated zone extending radially about 1 to 10 feet from the well. Thus, the volume to be used in any specific case will be determined by the thickness and porosity of the formation to be treated.

The foaming agents employed in the method of this invention are high-foaming, oil-soluble or water-soluble surfactants. The term high-foaming surfactant as used in this specification, and the appended claims, denotes a surfactant which, when placed in solution in a hydrocarbon or aqueous solvent in the amount of 5% by weight or less, is capable of producing suitable quantities of a thick, stable foam capable of substantially plugging the subterranean formation. The suitability of surfactants for use in the method of this invention may be experimentally determined by incorporating 5% or less, by weight, of the selected surfactant in the solvent which is to be used, such as crude oil. About 500 ml. of the surfactant-crude-oil solution is placed in a graduated cylinder to form a liquid column 50 centimeters in height. Gas is then introduced from the bottom of the column, through a fritted glass disc, at substantially atmospheric pressure, and permitted to bubble upward through the column of liquid at a rate of 500 ml. of gas per minute, per square inch of column cross-sectional area. After the gas has bubbled through the column of liquid for a period of 15 minutes, the height of the column of foam produced above the column of liquid is measured, and must be not less than 180 centimeters in height.

High-foaming surfactants, in accordance with this specification, are those which will meet the afore-defined test. It is preferred to employ surfactants capable of meeting the afore-described test with respect to foam quantity when quantities of surfactants substantially less than 5% by weight are incorporated in the aqueous or hydrocarbon solvent. In general, the amount of surfactant employed will range from about 0.5 to 5% by weight.

While the method of this invention is not considered to be limited to the use of particular surfactants, other than that they must meet the afore-defined requirements, suitable oil-soluble surfactants include di-coco dimethyl ammonium chloride, and mixtures of this material with decyl trimethyl ammonium chloride. Suitable water-soluble agents include water soluble surfactants such as Triton X–100 (iso-octyl phenyl polyethoxy ethanol, about 9–10 ethoxy groups/molecule), Triton GR-S (sulfonated alkyl esters), and Sifon ES sodium lauryl ether sulfate).

Other suitable materials can be selected from published lists of surfactants and their properties.

As a specific example of the method of this invention, it is desired to treat the formation surrounding a petroleum-producing well-bore, at which the gas-to-oil ratio has risen to a value of 10,000 to 1. The formation to be treated has a thickness of 20 feet, and it is desired to treat the formation to a radial distance of about 10 feet from the well-bore. Crude oil produced from the same formation, in the amount of 1,000 bbls., in which is incorporated 4% by weight of a 1-to-1 mixture of di-coco dimethyl ammonium chloride and decyl trimethyl ammonium chloride is forced down the well bore and injected into the formation. The well is then permitted to produce in the usual manner, and after being on stream for a period of one week, the well is tested and found to be producing at a gas-to-oil ratio of 100 to 1.

A water-producing well may be treated in the same manner as the above example, except that an aqueous solution of a water-soluble surfactant is substituted for the crude oil solution of oil-soluble surfactant.

The embodiments of the invention in which an exclusive property and privilege are claimed are defined as follows:

1. The method of treating a subterranean formation penetrated by a well which produces a liquid and a gas to decrease the rate of gas production without substantially decreasing the rate of liquid production, comprising terminating production of fluids from said well, injecting through said well and into said formation a solution of a high-foaming surfactant in a liquid miscible with the liquid produced from said well, said solution being injected in a quantity sufficient to penetrate the formation a radial distance of about 1 to 10 feet, said surfactant being present in sufficient quantity to form a stable foam when said solution is contacted by said gas, permitting said gas to contact said solution to generate a foam substantially only in the portion of said formation producing said gas and subsequently resuming production of fluids from said well.

2. The method in accordance with claim 1 in which said surfactant is incorporated in the solution in the amount of about 0.5 to 5% by weight.

3. The method in accordance with claim 1 in which the produced liquid is petroleum, and the liquid miscible therewith is a hydrocarbon liquid.

4. The method in accordance with claim 3 in which the treating solution is a solution of high-foaming surfactant in crude oil.

5. The method in accordance with claim 2 in which the produced liquid is water and the liquid miscible therewith is water.

References Cited by the Examiner

UNITED STATES PATENTS

| | | | |
|---|---|---|---|
| 2,127,662 | 8/38 | Grebe | 166—42 X |
| 2,713,906 | 7/55 | Allen | 166—42 X |

OTHER REFERENCES

Brown, W. E.: "Surfactant Treatment Selectively Seals Off Water Entry," in The Petroleum Engineer, November 1957, pp. B–72, B–80, B–82, B–84, B–86.

Dunning: "Foaming Agents: Cure for Water-Logged Gas Wells," The Petroleum Engineer, vol. 31, Number 12, November 1959, pp. B–28 to B–33.

Dunning: "Using Foaming Agents To Remove Liquids From Gas Wells," Bureau of Mines Publication, Monograph 11, 1961, 38 pp.

CHARLES E. O'CONNELL, *Primary Examiner.*

NORMAN YUDKOFF, *Examiner.*